United States Patent
Forslöw

(10) Patent No.: US 8,148,943 B2
(45) Date of Patent: Apr. 3, 2012

(54) METHOD AND ARRANGEMENT FOR DISCHARGING AN ENERGY STORAGE SYSTEM FOR ELECTRICAL ENERGY

(75) Inventor: Daniel Forslöw, Billdal (SE)

(73) Assignee: Volvo Technology Corp., Göteborg (SE)

( * ) Notice: Subject to any disclaimer, the term of this patent is extended or adjusted under 35 U.S.C. 154(b) by 409 days.

(21) Appl. No.: 12/518,910

(22) PCT Filed: Dec. 11, 2007

(86) PCT No.: PCT/SE2007/001099
§ 371 (c)(1),
(2), (4) Date: Jun. 12, 2009

(87) PCT Pub. No.: WO2008/079069
PCT Pub. Date: Jul. 3, 2008

(65) Prior Publication Data
US 2010/0026242 A1  Feb. 4, 2010

(30) Foreign Application Priority Data
Dec. 22, 2006  (WO) ............... PCT/SE2006/001502

(51) Int. Cl.
*H02J 7/00* (2006.01)
*H01C 1/08* (2006.01)
*H02H 11/00* (2006.01)

(52) U.S. Cl. ....... 320/127; 320/166; 338/53; 340/636.1; 307/326

(58) Field of Classification Search .......... 320/127, 320/118, 124, 166, FOR. 100, FOR. 101; 361/691; 338/53; 340/636.1; 180/65.21; 307/326

See application file for complete search history.

(56) References Cited

U.S. PATENT DOCUMENTS

| | | | | |
|---|---|---|---|---|
| 4,115,630 | A * | 9/1978 | Van Ommering et al. | 429/72 |
| 6,262,400 | B1 * | 7/2001 | Urbank et al. | 219/497 |
| 6,791,463 | B2 * | 9/2004 | Iwasaki et al. | 340/636.1 |
| 2010/0213904 | A1 * | 8/2010 | Yamada | 320/166 |
| 2011/0057627 | A1 * | 3/2011 | Kuehner | 320/166 |

FOREIGN PATENT DOCUMENTS

| | | |
|---|---|---|
| JP | 2001309551 A | 11/2001 |
| JP | 2004129367 A | 4/2004 |
| JP | 2006064683 A | 3/2006 |
| KR | 20040006298 A | 1/2004 |

OTHER PUBLICATIONS

JP 06060909 A, Sony Corp., Mar. 4, 1994; (abstract) Retrieved from: PAJ database.
International Search Report for corresponding International Application PCT/SE2007/001099.
International Preliminary Report on Patentability for corresponding International Application PCT/SE2006/001502.

* cited by examiner

*Primary Examiner* — Jay Patidar
(74) *Attorney, Agent, or Firm* — WRB-IP LLP

(57) ABSTRACT

A method and an arrangement for discharging an energy storage system for electrical energy, particularly in a vehicle having a hybrid drive line, by means of a first discharge resistor, wherein a coolant such as carbon dioxide gas is provided to the first discharge resistor during discharge of the energy storage system for leading off heat as well as a hybrid vehicle comprising such an arrangement.

25 Claims, 2 Drawing Sheets

METHOD AND ARRANGEMENT FOR DISCHARGING AN ENERGY STORAGE SYSTEM FOR ELECTRICAL ENERGY

BACKGROUND AND SUMMARY

The present invention relates to a method and an arrangement for discharging an energy storage system for electrical energy, particularly in a vehicle having a hybrid drive line (hereinafter referred to as "hybrid vehicle"), by means of a discharge resistor as well as to a hybrid vehicle comprising such an arrangement.

In the following the invention is described in connection with hybrid vehicles. However, the invention is not limited to this application. For instance, it can be also used in stationary power generation systems comprising such an energy storage system. The invention is also applicable to stationary and/or movable construction equipments such as construction vehicles or off road machines.

Hybrid vehicles in general comprise at least two drive engines, wherein a traditional combustion engine is most frequently supported by an additional electrical drive unit. The electric energy for running the electric drive unit is commonly provided by an energy storage system like high voltage capacitors or batteries, wherein the electric energy stored therein is produced by a fuel cell or a generator.

In case such a hybrid vehicle is involved in an accident there is a potential hazard to a rescue team or other assisting persons or to the driver and the passengers themselves due to the high voltage of the energy stored in the energy storage system. Therefore, the energy storage system has to be discharged in such situations as fast as possible.

In general, discharging a high voltage energy storage system is preferably performed by a discharge resistor. The discharge resistor limits the discharging current and prevents the energy storage system from exploding or behaving in an uncontrolled dangerous way during the discharge process or thereafter. The resistance of the discharge resistor is chosen to be large enough to keep control of the discharging process and to discharge the energy storage system without damaging it.

Another discharge process is disclosed in the Japanese patent application JP 2004129367 wherein two discharge methods (discharge by means of an usual discharge resistor and discharge by corona discharge) are performed in parallel. The discharge process itself is initialized in case of an accident.

Disadvantageously, the use of a large resistance for the discharge resistor or the use of the two discharge methods described above (even if they are performed in parallel) means that the discharge process takes several minutes before it is completed. During that time no safe rescue operation can be performed which might even cost a person's life.

It is desirable to provide a method and an arrangement for discharging an energy storage system for electrical energy that reduces the time needed for discharging the energy storage system. It is also desirable to provide a method and an arrangement that reduces the risk exposure of the environment for hazardous side effects caused by the discharge process.

A method and an arrangement for discharging an energy storage system for electrical energy (hereinafter generally referred to as "energy storage system"), as well as by a hybrid vehicle comprising such an arrangement are disclosed.

The invention is based, according to an aspect thereof, on the conclusion that one of the major limiting factors for using a resistor with a rather low resistance for discharging an energy storage system is the heat generated during the discharge process. Therefore, according to an aspect of the invention a coolant is provided at the resistor during the discharge process for leading off the heat produced during the discharge process. Advantageously, the discharge resistor can be made of an alloy having a positive temperature coefficient, such as canthal, constantan or tungsten.

In addition to the fact that its price is rather low, the use of carbon dioxide gas ($CO_2$) as coolant has the advantage that carbon dioxide gas also serves as fire extinguisher. In case the resistor and/or the energy storage system starts burning because of the heat developed by the fast discharge, the coolant also could stop, or prevent, the fire. Therefore, in a preferred embodiment of the invention the coolant is also provided at the energy storage system itself.

Further, in a preferred embodiment, the coolant is stored under pressure in a pressurized storage unit. Releasing the coolant results in a sudden drop of temperature of the storage unit. The sudden drop in temperature can also be used for further cooling down the energy storage system and/or the discharge resistor. This effect can be maximized by integrating the storage unit into the energy storage system and/or the discharge resistor. Integrating the storage unit has the further advantage that the arrangement size can be reduced.

Another advantageous embodiment uses at least one energy consumer being in connection with the energy storage system for discharging the energy storage system and/or to support the discharge process. In case a vehicle energy storage system needs to be discharged, the use of an electrical engine for discharging the energy storage system is preferred.

In another preferred embodiment, the initializing of the discharge process is triggered by a trigger signal. The trigger signal can be transmitted automatically for example by the vehicle and/or manually for example by a remote control operated by a rescue team.

Preferably, the trigger signal is transmitted by an accident sensing sensor or such system like an anti-collision detection system. The accident sensing sensor, or system, can be a sensor for realizing an accident the moment it happens, correlating the initialization of the discharge process for example to an airbag deployment signal, or an accident prediction sensor calculating the probability of an accident and transmitting the trigger signal in case the probability exceeds a certain threshold. Both solutions have the main advantage that the discharge is already in process when the rescue team arrives or is, in case of the accident prediction sensor, or system, already completed or almost completed.

It is further advantageous to provide a signal possibility signaling the status of the discharge process, i.e. that the discharge of the energy storage system is completed, or is still in process and/or still needs to be initiated and performed.

Further advantages and preferred embodiments are disclosed in the figures and the description.

BRIEF DESCRIPTION OF THE DRAWINGS

In the following the invention will be further described by means of the Figures. The embodiments shown are merely exemplary and are not intended to limit the claims thereto.

The Figures show.

DETAILED DESCRIPTION

Figure 1:
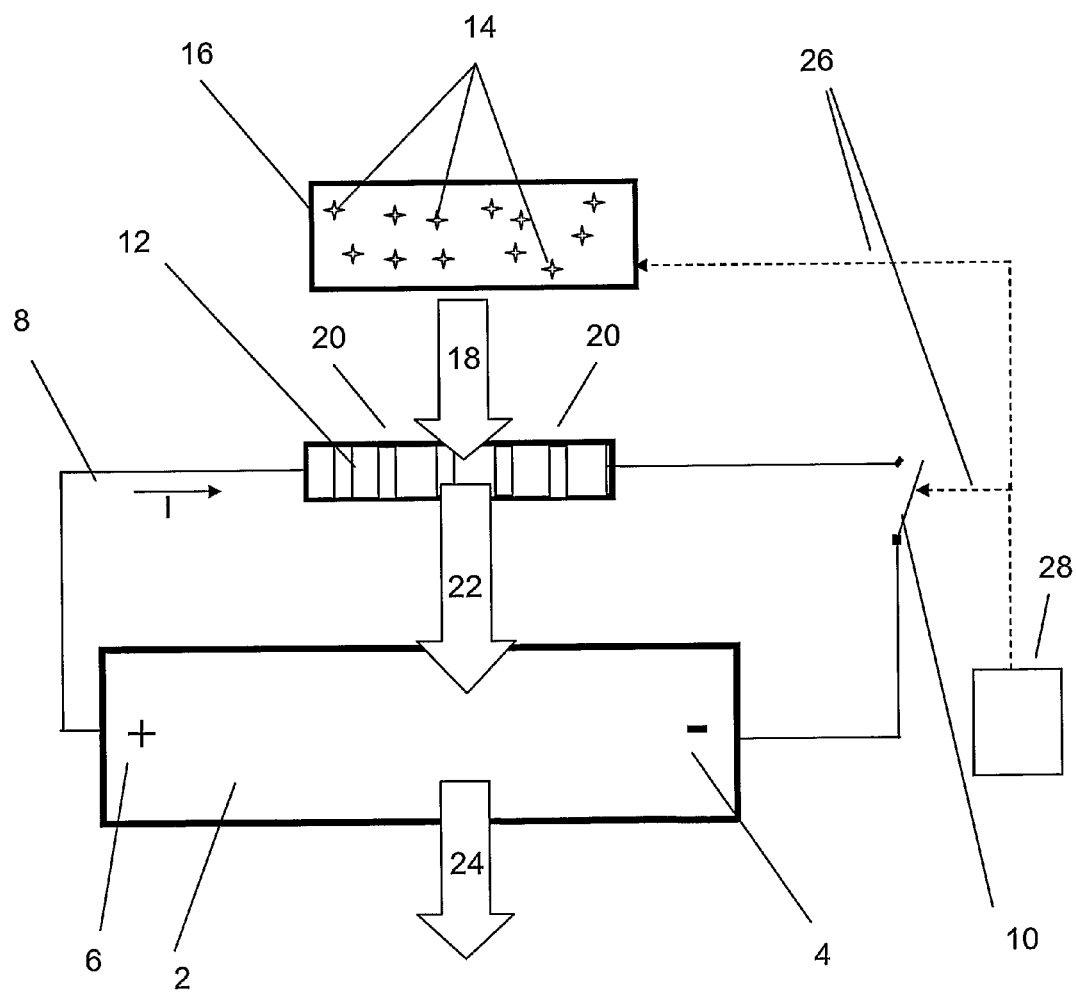
FIG. 1: a schematic view of a first preferred embodiment of an arrangement for discharging an energy storage system according to the invention.

FIG. 1 shows schematically a first preferred embodiment of the inventive arrangement. An energy storage system 2 stores electric energy produced by a fuel cell or a generator (not shown) and is designed for high voltages. Such a high voltage energy storage system stores energy in the range of typically several hundreds volts in contrast to a "normal" vehicle battery providing electric energy at voltage levels of 12 V or 24 V. The energy storage system 2 can comprise a plurality of capacitors or batteries connected in series having a minus pole 4 and a plus pole 6. FIG. 1 shows only a single capacitor or battery for the sake of simplicity.

In case of an accident, the energy storage system 2 is a potential hazard to a rescue team or other assisting persons or to the passengers of the vehicle due to the high voltage of the system. In such situations it is therefore necessary to discharge the energy storage system 2 as fast as possible to zero or to a safe level.

For discharging the energy storage system 2, minus pole 4 and plus pole 6 of the energy storage 2 are connected to a first electrical circuit 8 having a first switch 10. The first switch can be, for example, an electrical switch, a relay or a solenoid or a super conductor made in material like silicon carbide (SiC). As soon as the first switch 10 is closed the discharge process is started by closing the electrical circuit 8. For controlling the discharge and preventing the energy storage system 2 from being damaged, the first electrical circuit 8 comprises a first discharge resistor 12 limiting the discharge current I.

In a further embodiment, an already existing energy consumer can be used as discharge resistance or can be used to support the discharge process by consuming as much energy as possible. For example, in case the energy storage system of a vehicle should be discharged as fast as possible, it can be advantageous to use the electrical engine of the vehicle to consume as much energy as possible. Since this discharge process might take too long time, the energy consumer can also be used to only support the discharge process. The less energy is stored, the faster the discharge process will be.

The first discharge resistor 12 is for instance a wire resistor having a relatively low resistance and a positive temperature coefficient. In this case "low" is referring to the highest possible discharge current without anything dangerous will happen to the energy storage system 2, for instance exploding batteries. That also means that if the resistance is "too low" there might be the possibility of unwanted situations caused by the discharge itself like explosion of the battery, burning of the capacitor or emission of toxic gases. Therefore, the discharge current has to be adapted to the battery and capacitor, respectively, used in the system. If the resistance is "too high" the discharge process is too slow. It can be therefore preferable to use a resistor 12 which resistance is heat dependent. That means in case the resistor 12 is cold it provides a relatively low resistance but if the temperature increases the resistance also increases.

Such resistors are made, for example, from canthal-, constantan- or tungsten-wires. Due to the relatively low resistance the energy storage system 2 can be discharged quite fast, preferably within seconds instead of minutes as with resistors known from the state of the art. Unfortunately, the relatively fast discharge process also produces a lot of heat even if a resistor having a positive temperature coefficient is used. The discharge heat involves the risk of burning and therefore the imminence of fire or/and explosion of the whole system.

To reduce the risk of burning but to allow a very fast discharge, the inventive arrangement comprises a coolant 14, as for example carbon dioxide gas ($CO_2$), which is stored in a coolant storage unit 16 such as a tank, preferably under pressure. Releasing the coolant, results in a sudden drop of temperature of the storage unit. The sudden drop in temperature can also be used for further cooling down the energy storage system and/or the discharge resistor.

Since the storage itself provides a cooling source, when having released the coolant, the storage unit 16 can also be an integral part of the energy storage system 2 and/or of the discharge resistor 12. This has the further advantage that no coolant loss due to long transport paths can occur. But it is also possible to only incorporate the coolant storage unit into the energy storage system and directing the coolant jet to the discharge resistor, whereby the drop of temperature effect is used to cool down the energy storage system, and the coolant is used to cool the discharge resistor; or vice versa.

The use of carbon dioxide gas has the additional advantage that in case the system catches fire anyhow, carbon dioxide gas also serves as fire extinguisher. In principle, any electrically non-conducting gas or fluid can be used which is suitable to serve as coolant and which is flame resistant, too, as for instance an inert gas.

In case the discharge process is started by closing the first switch 10 the coolant 14 is led to the first discharge resistor 12. This is indicated by arrow 18 in FIG. 1. For an optimal cooling of the first discharge resistor 12, the first discharge resistor 12 comprises a plurality of cooling holes 20 which enable the coolant (or simply air) to cool the resistor wires of the first discharge resistor 12.

The coolant 14 can be led to the first discharge resistor 12 by providing means such as guidance channels (not shown). In case the coolant 14, as for example $CO_2$, is stored under pressure and located in the vicinity of the first discharge resistor 12 such extra providing means are not necessary since opening the pressure tank 16 causes a coolant jet out of the opening of the tank 16 which can be directed towards the first discharge resistor 12.

It is further preferable to lead the coolant 14 to the energy storage system 2 as well. Since the fast discharge process has a heat-related impact onto the energy storage system 2 itself, a cooling of the energy storage system 2 would allow an even more faster discharge process. Providing of the coolant 14 to the energy storage system 2 is indicated by arrow 22. For that, the coolant 14 can be led through the first discharge resistor 12 and after that to the energy storage system 2, but it is also possible to split the coolant flow and lead one portion to the first discharge resistor 12 and the other portion to the energy storage system 2. The portions can be of the same size, but it is also possible to provide more coolant at the first discharge resistor 12 and only a small portion of the coolant 14 at the energy storage system 2, or vice versa.

It is also possible to place the first discharge resistor 12 in the vicinity of the energy storage system 2 or to integrate the first discharge resistor 12 or part of it into the energy storage system 2. This simplifies the providing of the coolant 14 to both the first discharge resistor 12 and the energy storage system 2.

After cooling the first discharges resistor 12 and/or the energy storage system 2, the coolant 14 is led to the environment. This is indicated by arrow 24.

The first switch 10 is operated by a trigger signal 26 originating from a trigger signal generating source 28 which initializes the discharge process. The trigger signal causes a closure of the first switch 10 and an opening of the coolant storage 16 for providing the coolant 14 to the first discharge resistor 12 and/or to the energy storage system 2 during the discharge process.

The trigger signal 26 can be transmitted manually and/or automatically. In case the signal is transmitted manually, a person, for example from a rescue team or a passenger, can initiate the discharge process by pressing a button located at the vehicle or operating a remote control. Operating a remote control has the advantage that a direct contact with the vehicle can be avoided. It is also possible that the vehicle itself transmits a signal to a remote control signaling that a discharge is necessary. This might be preferable in case the automatic initiation fails or a further control of the initiation of the discharge process is desired.

In another preferred embodiment the transmission of the trigger signal is performed automatically. For example, the trigger signal can be transmitted by an accident sensing system or sensor. The accident sensing system or sensor senses whether an accident has happened and then transmits the trigger signal. Since the same principle is applied to the deployment of airbags, the trigger signal can also be correlated to an airbag deployment signal.

The accident sensing system or sensor can also be part of an accident prediction system. An accident prediction system calculates the probability of an accident and is enabled to transmit the trigger signal in case the calculated accident probability exceeds a certain predefined threshold. Preferably the trigger signal is transmitted a predetermined time before the accident happens so that at the moment of the actual accident the energy storage system is already (almost) completely discharged or at least to a large extent discharged. In order to achieve a discharge of the energy storage system to a (predefined) "wanted" or "safe" level of energy left in the energy storage system the predetermined time period can be correlated to the time necessary to discharge the energy storage system to said "safe" level or to zero. The main advantage of the initiation of the discharge process already before the actual accident happens is that immediately after the happening of the accident a rescue team or other persons can get to the vehicle and provide help without running a risk to be negatively impacted by any hazardous effects caused by energy stored in the energy storage system 2.

In other preferred embodiments, an information signal and/or a "safe"-signal can be transmitted in addition to the trigger signal. The information signal—that signals that a discharge process is in process or still needs to be performed—can be transmitted for example to a rescue service center, an accident notification center, an accident recorder or to the outside of vehicle in general. The information signal can also be in form of an acoustic or optical warning signal warning persons not to get near the vehicle in case the discharge process has failed or is still ongoing or still needs to be performed.

The "safe" signal signals that the discharge process has been completed or the energy storage system is not charged to a hazardous level so that any person coming to an accident scene can be sure that despite the existence of the energy storage system 2 in the vehicle it is not perilous anymore to approach the vehicle and to provide help.

It is also possible to combine the manual and automatic transmission of the trigger signal so that in case the automatic transmission fails due to damage of the vehicle, the discharge can be initiated anyway.

In addition to the first discharge resistor 12 and the first electrical circuit 8, a second (independent) electrical circuit comprising a second discharge resistor having a resistance higher than the resistance of the first discharge resistor 12 can be provided for a controlled discharge process which is slower in time than the discharge process controlled by the first discharge resistor 12. Instead of using two different discharge resistors comprised in two different electrical circuits, it is also possible to use a single discharge resistor with an adjustable resistance.

Figure 2:
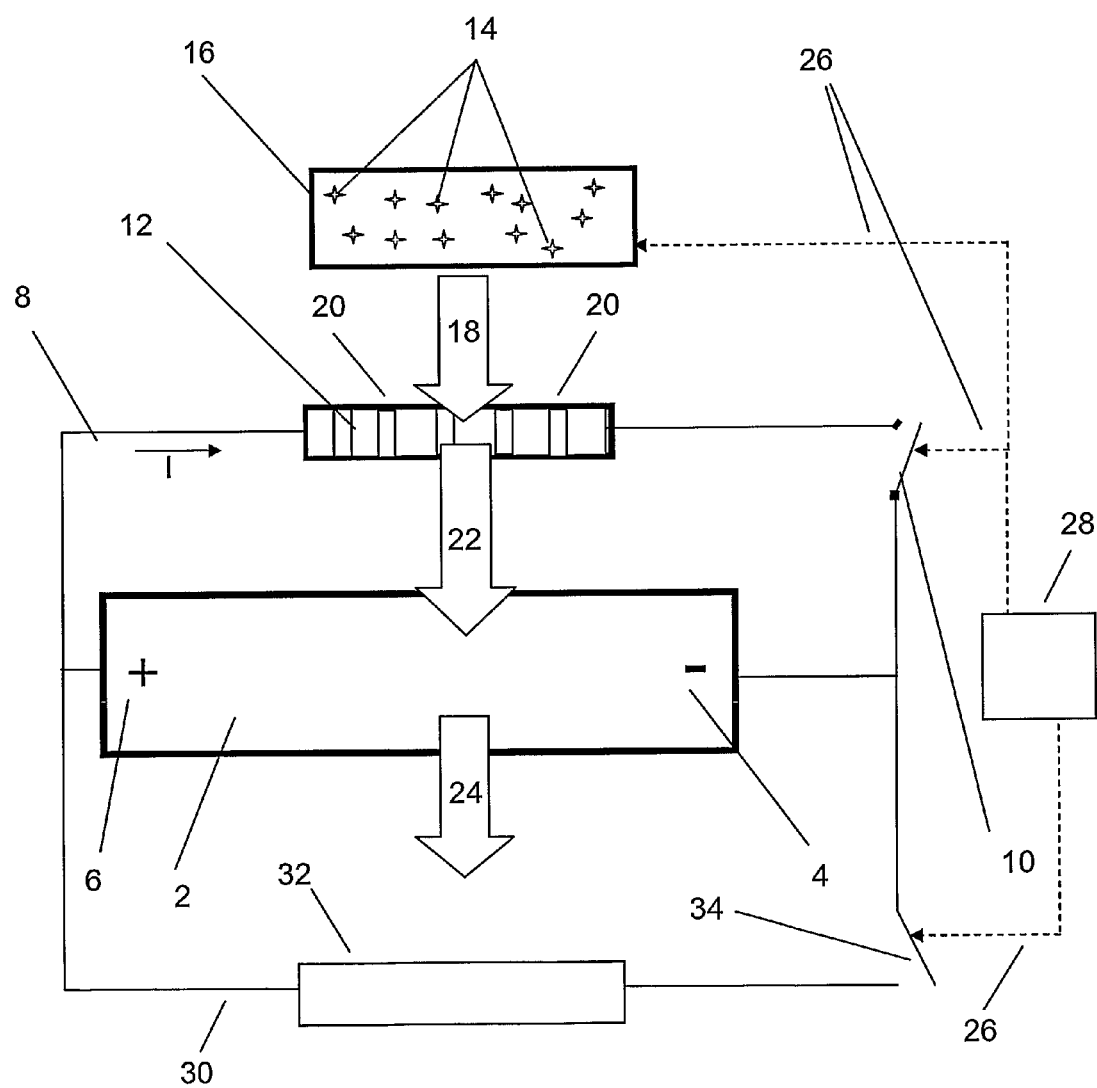
FIG. 2: a schematic view of a second preferred embodiment of an arrangement for discharging an energy storage system according to the invention.

A corresponding second embodiment of the inventive arrangement is shown in FIG. 2. FIG. 2 shows the same components as FIG. 1, but additionally illustrates a second electrical circuit 30 comprising a second discharge resistor 32 and a second switch 34. In principle, it is also possible to use a single 3-position switch (instead of the two switches 10 and 34 in FIG. 2) which either closes the first electrical circuit 8 or the second electrical circuit 30.

The second switch 34 in FIG. 2 is also operated by a trigger signal 26 generated by a trigger signal generating source. As shown in FIG. 2, the trigger signal generating source can be the same as the trigger signal generating source 28 transmitting the trigger signal 26 to the first switch 10.

In contrast to the discharge process performed by the first electrical circuit 8 with the first discharge resistor 12, the discharge process performed by the second discharge circuit 30 and the second discharge resistor 32 is much slower due to the higher resistance of the second discharge resistor 32. The discharge process using the second discharge resistor 32 is therefore not performed in case of emergency but in all other "non-emergency" cases where a discharge of the energy storage system 2 is needed as well like maintenance, repair or simply parking. The trigger signal 26 is therefore in this case not correlated or associated with an accident related system like the accident sensing sensor described above.

The trigger signal 26 for the second switch 34 can be transmitted manually by a driver or a repair person by pressing a corresponding button located at the vehicle or by operating a remote control. In principal it is also possible to initiate the trigger signal 26 automatically. This can be done for example by correlating the transmission of the trigger signal 26 to a GPS signal signaling the position of a garage (or any other maintenance place), or by correlating the transmission of the trigger signal 26 with an operation of a central locking system of the vehicle.

The "slower" discharge process enabled by closing the second electrical circuit 30 has the advantage that it reduces the risk exposure for the environment for hazardous side effects caused by the discharge process even further.

Preferably, an already existing energy consumer is used as second discharge resistor 32, particularly the engine of a vehicle. The discharge by an energy consumer is a slower and softer process, ensuring that the energy storage system will not be damaged.

REFERENCE SIGNS 2 energy storage system
4 minus pole
6 plus pole
8 first electrical circuit
10 first switch
12 first discharge resistor
14 coolant
16 coolant storage
18 coolant flow to discharge resistor
20 cooling holes
22 coolant flow to energy storage system
24 coolant flow to environment
26 trigger signal
28 trigger signal generating source
30 second electrical circuit
32 second discharge resistor
34 second switch

The invention claimed is:

1. Method for discharging an electrical energy storage system by a first discharge resistor, comprising storing a coolant under pressure in storage unit; and
opening the storage unit for generating a coolant jet in order to provide the coolant to the first discharge resistor during discharge of the energy storage system for leading off heat.

2. Method according to claim 1, wherein the coolant is also provided to the energy storage system.

3. Method according to claim 1, wherein the coolant is carbon dioxide gas.

4. Method according to claim 1, further comprising the step of initializing the discharge of the energy storage system by a trigger signal.

5. Method according to claim 4, wherein the trigger signal is transmitted by a manually operable signal transmitter.

6. Method according to claim 4, wherein the trigger signal is automatically transmitted by an accident sensing sensorl.

7. Method according to claim 6, wherein the trigger signal is transmitted when accident probability exceeds a predetermined accident probability threshold.

8. Method according to claim 1, further comprising the step of transmitting an information signal in case the discharge is initiated, wherein the information signal is transmitted to at least one of a rescue service center and to an accident notification center and to an accident recorder.

9. Method according to claim 1, further comprising the step of transmitting a safe signal in case at least one of the energy storage system is discharged to a predetermined level, and a predetermined time period necessary for discharging the energy storage system to a predetermined level has elapsed.

10. Method according to claim 1, wherein the discharge resistor is made of a metal alloy having a positive temperature coefficient.

11. Method according to claim 1, comprising performing the method only in predetermined circumstances using a second discharge resistor or a suitable energy consumer in all other circumstances wherein the second discharge resistor has a resistance to perform a discharge of the energy storage system in a longer time period than the discharge of the energy storage system via the first discharge resistor.

12. Arrangement for discharging an electrical energy storage system comprising
an energy storage system,
a first discharge resistor connectable to the energy storage system by a first connector,
at least one storage unit for storing a coolant under pressure, wherein opening the storage unit generates a coolant jet; whereby the coolant is provided to the first discharge resistor during discharge of the energy storage system for leading off heat.

13. Arrangement according to claim 12, wherein the coolant is also provided to the energy storage system.

14. Arrangement according to claim 12, wherein the coolant is carbon dioxide gas.

15. Arrangement according to claim 12, wherein the first discharge resistor has a plurality of resistor wires and comprises a plurality of holes (20) for introducing the coolant to the resistor wires.

16. Arrangement according to claim 12, wherein the first discharge resistor is made of a metal alloy having a positive temperature coefficient.

17. Arrangement according to claim 12, wherein the first connector is an electrical switch, a relay or a solenoid or a super conductor made in material like silicon carbide (SiC).

18. Arrangement according to claim 12, further comprising a trigger signal transmitter for transmitting a trigger signal initiating the discharge of the energy storage system.

19. Arrangement according to claim 18, wherein the trigger signal transmitter is a manually operable signal transmitter.

20. Arrangement according to claim 18, the trigger signal transmitter is part of an accident sensing sensor designed to automatically transmit the trigger signal.

21. Arrangement according to claim 12, further comprising an information signal transmitter transmitting an information signal in case the discharge is initiated.

22. Arrangement according to claim 12, further comprising a safe signal transmitter for transmitting a safe signal in case the energy storage system is discharged to at least one of a predetermined level and a predetermined time period necessary for discharging the energy storage system to a predetermined level has elapsed.

23. Arrangement according to claim 18, wherein the trigger signal transmitter is realized by a single signal transmitter.

24. Arrangement according to claim 12, wherein the first discharge resistor is used only in predetermined circumstances, wherein the arrangement comprises a second discharge resistor connectable to the energy storage system by a second connector, wherein the second discharge resistor is used in all circumstances other than the predetermined circumstances and wherein the second discharge resistor has a resistance such that it performs a discharge of the energy storage system in a longer time period than the time period needed for the discharge of the energy storage system via the first discharge resistor.

25. Vehicle comprising an arrangement for discharging an electrical energy storage system according to a claim 12.

* * * * *